May 26, 1936. W. ABENDROTH Re. 19,977

STEAM GENERATOR

Original Filed Oct. 23, 1931 2 Sheets-Sheet 1

Inventor:
Wilhelm Abendroth.
By George Rice
Atty.

May 26, 1936. W. ABENDROTH Re. 19,977

STEAM GENERATOR

Original Filed Oct. 23, 1931 2 Sheets-Sheet 2

Inventor:
Wilhelm Abendroth
By George Rae
Atty.

Reissued May 26, 1936 Re. 19,977

UNITED STATES PATENT OFFICE 19,977

STEAM GENERATOR

Wilhelm Abendroth, Berlin-Charlottenburg, Germany, assignor to Siemens-Schuckertwerke Aktiengesellschaft, Berlin-Siemensstadt, Germany, a corporation of Germany Original No. 1,925,222, dated September 5, 1933, Serial No. 570,751, October 23, 1931. Application for reissue December 1, 1934, Serial No. 755,615. In Germany October 24, 1930

14 Claims. (Cl. 122—249)

My invention relates to improvements in steam generators and more particularly to an arrangement in critical-pressure steam generators.

By a critical-pressure steam generator is to be understood a steam generator in which the working medium in being converted into steam passes from the liquid to the gaseous state at the critical pressure and critical temperature. There is no surface of separation between the liquid and the vapor, and the latent heat is zero. The pressure is raised by means of a pump. The critical-pressure steam generator is constructed without any drums and consists merely of a tube, or tubes, through which the working medium is forced by a pump. The steam generator is subdivided into two parts, viz, into one part in which the heat is transmitted by radiation (radiation heating part) and a second part, in which the heat is transmitted by contact of the hot gases with the tubes (contact heating part). In the previous constructions of the critical-pressure steam generator, the conversion zone, in which the working medium changes its form from a liquid to a vapor, lies within the radiation heating part.

At high degrees of heat in the radiation heating part it has been found that when disturbances occur they do not do so in the part having the highest temperatures but in regions of somewhat lower temperature and particularly close to, or in, the zone in which the conversion of the liquid to vapor takes place. The reasons for this are not yet entirely known. It can, however, be assumed that it is caused by some disturbance in the transmission of the heat. The problem, therefore, arose of altering the construction of the critical-pressure steam generator in such a manner as to avoid the disturbances in the conversion zone. The solution found was to give such proportions to the tube system that the zone in which the liquid working medium is converted into vapor lies in the contact heating part. The conversion zone is, therefore, withdrawn from the influence of the radiating heat. The experience gained in service with critical-pressure steam generators constructed in that manner shows that the disturbances with which one heretofore had to contend are thereby eliminated. The further heat transmission necessary for obtaining the desired final condition of the steam need not take place in the contact heating part, but the tube system may be led back into the radiation heating part.

The transfer of the conversion zone into the contact heating part renders a further development of the critical pressure steam generator possible. It is a well known fact that the working of tubular steam generators of the water-tube type with forced water circulation is very liable to be affected, if the water used is not sufficiently pure. In the course of time deposits of scale are formed in the tubes and reduce the section of passage. The formation of scale is a consequence of the concentration of the lye.

When using critical-pressure steam generators, it is in many cases possible to provide feed water of the desired purity but special cases may occur in which undesirable impurities find their way into the feed water. That might, for instance, be the case if the condenser leaks so that the cooling water mixes with the condensate. The concentration of the lye is not the same at all parts of the circulation, but increases towards the conversion zone. An automatic purification of the water as in the case of an ordinary boiler is not possible, as in critical-pressure steam generators there are no drums in which the concentration of the lye is gradually increased and in which the lye collects. Owing to the special features of the steam generator working at the critical pressure, a way can be found to make is possible for the enriched lye to be removed, consisting in the insertion of a wider tube in the conversion zone. The idea is to insert in the path of flow a small drum or header which, owing to the high pressures, can only have small dimensions and may be regarded as a widening of the tube. The steam generator will generally be so operated as to cause a slight overheating of the steam in the widened part of the tube. If it is now desired to drain off the concentrated lye, the temperature of the gases in the contact heating part is reduced, for example, by diminishing the supply of fuel. Consequently the temperature in the widened tube also drops. But, as the critical pressure of the contents of the tube is maintained by the pump independently of the obtaining temperature, the tube fills with a medium at critical pressure but at a temperature below the critical, i. e. it fills with liquid. Now, since, as mentioned above, the concentration of the lye increases the more it approaches the evaporation zone, the greatest concentration of the lye is just attained when the liquid enters the widened tube. If, therefore, the latter is provided with an emptying device, the concentrated lye can be removed from the steam generator. By increasing the heat supplied, the temperature is again raised and the widened tube is made to be re-situated behind the conversion zone in the steam current. Tests have shown that the widened tube should have such proportions that the velocity of flow in same does not exceed 0.5 metres per second. The widened tube is advantageously so placed as not to be within the influence of the flue gases.

As in tubular steam generators with forced water circulation the individual tubes connected in parallel are joined up to collectors to obtain a good mixing of their contents and are from there led back into the steam generator, it is under circumstances possible to provide one of these existing collectors with a device for blowing off the enriched lye, if said collector is situated in a region in which the temperature is capable of being reduced below the critical by reducing the temperature of the flue gases.

The device according to the invention distinguishes from the ordinary boiler drum by being continually in the steam current and is only at certain times filled with the lye to be removed, whereas the usual boiler drum serves primarily for the reception of liquids.

The invention will now be described with reference to the accompanying drawings of which:

Figure 1:
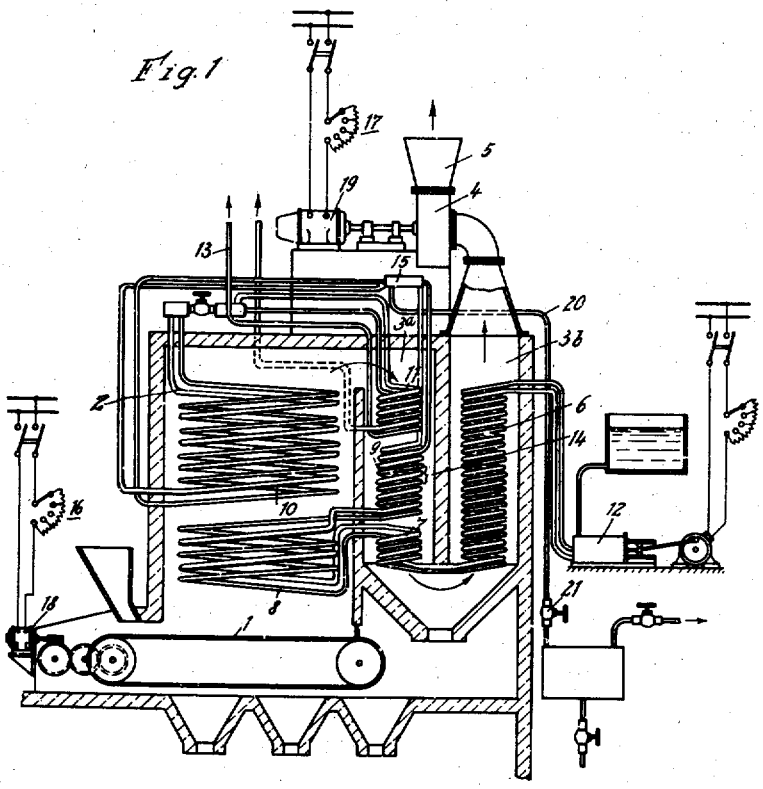
Figure 1 is an elevation partly in section of one form of the invention.

Figure 1 shows a steam generator heated, for example, by a furnace provided with a chain grate stoker 1 and containing a combustion chamber 2 and two flue-gas chambers 3*a* and 3*b*. The flames from the fire on the chain grate 1 first rise in the combustion chamber 2, from where the flue gases from the flames after being diverted at the upper end of the combustion chamber descend in the chamber 3*a*. At the bottom end of the chamber 3*a* they are again diverted and after having risen in the chamber 3*b*, they are finally drawn off by the blower 4 and conveyed into the chimney 5. In the chambers 2, 3*a* and 3*b* are coiled tubes 6, 7, 8, 9, 10 and 11, through which by means of a pump 12 the working medium is forced successively in a continuous flow and at a gradually rising temperature. The generated steam is conveyed through the pipe line 13 to the steam-consuming machine or apparatus. As the coiled tubes 8 and 10 are directly swept by the flames from the fire on the grate, the heating of these parts of the tube is, of course, brought about mainly by radiation, whereas the coiled tubes 6, 7, 9 and 11 located in the chambers 3*a* and 3*b* are heated through being in contact with the hot flue gases. When the steam generator is in operation, the working medium, which the pump presses successively through the tube coils 6, 7, 8, 9, 10 and 11, remains in a liquid state as long as the critical temperature corresponding to the critical pressure is not yet reached. As soon as that is the case, the liquid changes into steam. This zone, in which the conversion of the liquid into steam takes place, is situated according to the invention approximately within that part of the tube which is indicated by the bracket and the reference numeral 14.

Furthermore it will be seen from the drawings that behind (seen in the direction of flow of the working medium) said conversion zone 14 a widening 15 in tubular form is provided. As long as the steam generator is in normal operation, the conversion zone 14 is in the chamber 3*a*, heated by the flue gases, at a point before the widening 15 of the tube, in the direction of flow. To remove the sludge, or mud in the said way according to the invention, all that is necessary is to vary the speed of the two motors 18 and 19 by means of the two regulators 16 and 17 in such a manner as to reduce the temperature of the flue gases until the liquid advances into the widened tube 15. As already mentioned above, the liquid thereby made to enter the widened tube 15 is particularly enriched with salts.

This liquid can then be blown out through the pipe 20 and the valve 21. After the concentrated lye has been removed from the steam generator in this manner the conversion zone is made to return to a point before the widened tube in the chamber 3*a*. This is done simply by increasing the temperature of the flue gases. Fig. 1 also shows an expedient manner of conducting the tubes after they have left the sludge-removing zone, i. e. the widened tube. As illustrated, the tubes may be led back into the radiation heating chamber 2, where they are exposed to the heat necessary for superheating the steam flowing in the tubes.

There is, of course, no obstacle to applying the invention to steam generators having a plurality of tubes connected in parallel as shown on the drawings.

In the foregoing the removal of the sludge was described as being possible after the heating of the steam generator has been reduced. There is, however, also a second way of removing the sludge, consisting not in reducing the heating of the steam generator but in increasing the quantity of working medium fed into same. In this case the conversion zone is also shifted in the direction of flow of the working medium. According to the invention this fact is made use of for example, in steam generators having a plurality of tubes connected in parallel, by providing a sludge-removing pipe behind the conversion zone in each tube and by increasing the quantity of flow through the tube line from which the sludge is to be removed. The conversion zone is thereby shifted up to the point where the sludge-removing pipe is joined on to the tube and the liquid takes the place of the steam, so that the concentrated lye can be blown off through the sludge removing pipe. Furthermore according to the invention a device, the action of which is similar to that of a check valve and which during the removal of the sludge prevents the working medium from flowing back from the tubes not being cleaned at the moment, is provided behind the point at which the sludge-removing pipe is joined on to each tube.

The manner in which the sludge is removed from the tube, or tubes, will be more fully described in the following with reference to Figs. 2 to 5 of the accompanying drawings. As shown, the heated surfaces of the steam generator consist solely of tubes.

The latter are located partly in a combustion chamber 51 and partly in the gas flues 52 and 53, so that they are heated in part by radiation and in part by contact. The steam generator is, by way of example, provided with a chain grate stoker 54. The hot gases produced by the flames are first diverted in the upper part of the chamber 51 and enter the chamber 52 from which, after having been again diverted at the bottom of this chamber, they pass through the second flue 53 and leave the same at the top. The working medium is pressed through the tubes, for example, by means of a pump 55 driven by a regulable electric motor 56. In the drawings the steam generator is shown as having, for example, three tubes connected in parallel. As will be seen, the working medium takes the following path. It is introduced by the main pipe 57 and is first distributed by the header 58 into, for example, three parallel tubes situated in the flue 53. In the further course of its circulation the working medium is repeatedly mixed in headers and again distributed into further parallel tubes. On its way it passes through the headers 59 to 69. The heating surface should be so proportioned that the zone within which the liquid is converted to vapor lies approximately at the place indicated by the brackets and the reference numerals 70, 71, and 72. Before the header 65 which is situated behind the conversion zone, as seen in the direction of flow of the working medium, are inserted devices 73, 74, 75 respectively, for throttling return currents in each of the tube lines.

Figure 2:
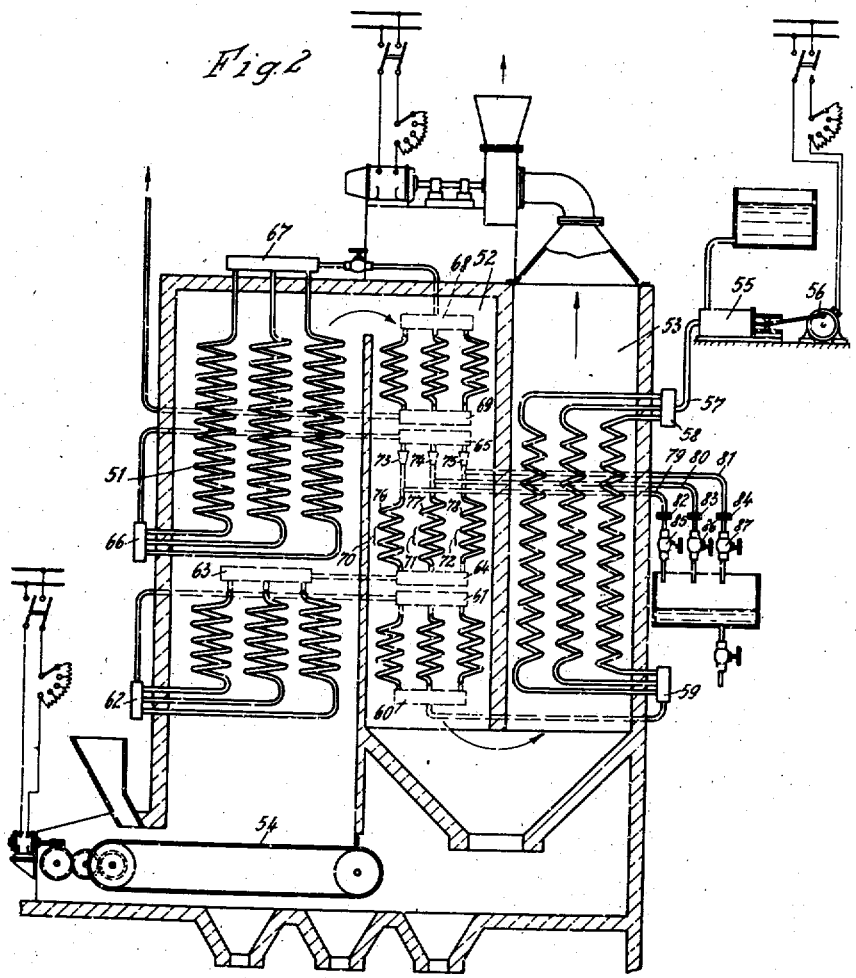
Figure 2 is a view similar to to Figure 1 showing a modification.
Figure 3:
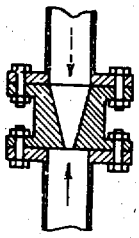
Figure 3 shows in cross section one of the throttling devices employed in Figure 2.

The arrangement of the throttling devices 73, 74 and 75 and their shape is to be seen particularly in Fig. 2. By a device for throttling return currents is to be understood a nozzle so fitted in the path of flow that in normal operation the working medium enters the nozzle at its smallest section and leaves it at its largest section. The conversion of pressure into speed which takes place at the narrowest part of the nozzle is with this arrangement nullified by the diffusing action of the diverging part. In normal operation of the steam generator the nozzle built-in in this manner would cause but an inconsiderable loss of pressure. This is, however, not the case, if the direction of flow is reversed, i. e. if the working medium enters the nozzle at its largest section and leaves it at its narrowest section. In this case no part acting as a diffuser follows the narrowest section, so that with this direction of flow the nozzle has a strong throttling effect. This fact is made use of in the manner further described below.

As will be seen in the drawings, sludge-removing pipes 79, 80 and 81 are joined to each of the tubes 76, 77 and 78 at a point situated between the conversion zone and the throttling devices 73, 74, 75. At the end of these sludge-removing pipes are provided throttling disks 82, 83 and 84 and closing valves 85, 86 and 87.

If sludge is to be removed from, for example, the tube 76, the procedure is as follows: First the conversion zone 70 within which the liquid changes into steam has to be shifted far enough for the liquid containing sludge or salts to reach at least the point where the corresponding sludge-removing pipe 79 leaves the tube.

Figure 4:
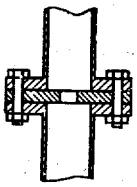
Figure 4 shows a throttling disk employed in the modification illustrated in Figure 2.

In the present case it is assumed that the displacement of the conversion zone is to take place through increase of the quantity of working medium flowing through the tube in question. For the sake of simplicity, we will take a concrete case and assume that for displacing the conversion zone 70 in the tube 76 double the quantity of liquid must be made to flow through this tube, and that the pump has delivered a quantity Q of working medium. With three tubes in parallel the quantity of liquid to be delivered by the pump must then be increased to about 4/3 Q. At the same time at which the delivery of the pump is increased, the closing valve 85 is opened to blow off the lye. If during this procedure the quantity of steam generated is to remain unaltered, the valve 85 will have to be opened just far enough to allow 1/3 Q to escape through the sludge-removing pipe 79. To ensure steady working conditions, I suggest according to my invention placing a throttling disk 82 in front of the valve 85, which, even if the latter is opened to its fullest extent, limits automatically the quantity of flow to about $$\frac{Q}{3}$$

at the predetermined pressure of the pump. Fig. 4 shows this throttling arrangement on an enlarged scale. When by this means a sufficient quantity of liquid has been removed from the tube 76, the valve 85 is closed and simultaneously one of the valves 86 or 87 opened, or in case the removal of the sludge from the two tubes 77 and 78 has already been carried out, the delivery of the pump is at once reduced to the normal amount Q. In this connection the importance of the devices for throttling return currents 73, 74 and 75 becomes obvious. If these throttling devices were not provided, a certain amount of working medium would flow back from the header 65 during the time the sludge is being removed from one of the tubes. Since, as described above, the nozzle, or throttling device, is so fitted as to prevent to a considerable degree the working medium from flowing back, the quantity of working medium fed to the tubes situated beyond the header 65 is practically the same during the removal of sludge as in normal operation.

Figure 5:
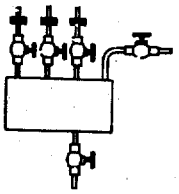
Figure 5 shows an alternative form of sludge tank which may be employed in the modification illustrated in Figure 2.

Fig. 5 shows that the lye blown out when removing the sludge can be collected in a closed tank, from which the vapor, or the steam developed when concentrating the lye through additional heating, may be conveyed to, and utilized in, a low-pressure steam consumer.

I claim as my invention:

1. A vapor generator comprising a furnace, a heating surface formed of tubes, a part of said heating surface being so located as to absorb mainly radiated heat and a part so located as to absorb heat transmitted mainly by contact, a pump serving to force the working medium through the tubes in the radiation heating part and the contact heating part at at least critical pressure in continuous flow and with constantly increasing temperature, said tubes being so dimensioned that the zone in which the working medium is converted from a liquid to a vapor is situated in the contact heating part.

2. A vapor generator comprising a furnace, a heating surface formed of tubes, a part of said heating surface being so located as to absorb mainly radiated heat and a part so located as to absorb heat transmitted mainly by contact, a pump serving to force the working medium through the tubes in the radiation heating part and the contact heating part at at least critical pressure in continuous flow and with constantly increasing temperature, said tubes being so dimensioned that the zone in which the working medium is converted from a liquid to a vapor is situated in the contact heating part, and at least a part of the tubes located behind the conversion zone, in the direction of flow of the working medium, being led back into the radiation heating chamber.

3. A vapor generator comprising a furnace, a heating surface formed of tubes, a part of said heating surface being so located as to absorb mainly radiated heat and a part so located as to absorb heat transmitted mainly by contact, a pump serving to force the working medium through the tubes in the radiation heating part and the contact heating part at at least critical pressure in continuous flow and with constantly increasing temperature, said tubes being so dimensioned that the zone in which the working medium is converted from a liquid to a vapor is situated in the contact heating part, and a widened tube provided with a device for removing impurities, said widened tube being with respect to the direction of flow of the working medium situated behind the conversion zone.

4. A vapor generator comprising a furnace, a heating surface formed of tubes, a part of said heating surface being so located as to absorb mainly radiated heat and a part so located as to absorb heat transmitted mainly by contact, a pump serving to force the working medium through the tubes in the radiation heating part and the contact heating part at at least critical pressure in continuous flow and with constantly increasing temperature, said tubes being so dimensioned that the zone in which the working medium is converted from a liquid to a vapor is situated in the contact heating part, and a widened tube provided with a device for letting out impurities, said widened tube being with respect to the direction of flow of the working medium situated behind the conversion zone and withdrawn from the influence of the flue gases.

5. A vapor generator comprising a furnace, a heating surface formed of tubes, a part of said heating surface being so located as to absorb mainly radiated heat and a part so located as to absorb heat transmitted mainly by contact, a pump serving to force the working medium through the tubes in the radiation heating part and the contact heating part at at least critical pressure in continuous flow and with constantly increasing temperature, said tubes being so dimensioned that the zone in which the working medium is converted from a liquid to a vapor is situated in the contact heating part, at least a part of the tubes located behind the conversion zone, in the direction of flow of the working medium, being led back into the radiation heating chamber, and at least one collecting header situated, with respect to the direction of flow of the working medium, behind the conversion zone, the tubes coming from the conversion zone and led back to the radiation chamber being joined up to said header, said header being provided with a device for removing impurities.

6. A vapor generator comprising a furnace, a heating surface formed of tubes, a part of said heating surface being so located as to absorb mainly radiated heat and a part so located as to absorb heat transmitted mainly by contact, a pump serving to force the working medium through the tubes in the radiation heating part and the contact heating part at at least critical pressure in continuous flow and with constantly increasing temperature, said tubes being so dimensioned that the zone in which the working medium is converted from a liquid to a vapor is situated in the contact heating part, and a pipe for removing sludge and capable of being closed joined to each tube behind the conversion zone with respect to the direction of flow of the working medium, said tubes being then joined up to a common header, a member offering a higher resistance to the flow of working medium from the header to the point at which the sludge removing pipe is joined up than to the flow in contrary direction being inserted in each tube between the header and the point at which the sludge removing pipe is joined up.

7. A vapor generator comprising a furnace, a heating surface formed of tubes, a part of said heating surface being so located as to absorb mainly radiated heat and a part so located as to absorb heat transmitted mainly by contact, a pump serving to force the working medium through the tubes in the radiation heating part and the contact heating part at at least critical pressure in continuous flow and with constantly increasing temperature, said tubes being so dimensioned that the zone in which the working medium is converted from a liquid to a vapor is situated in the contact heating part, a pipe for removing sludge and capable of being closed joined to each tube behind the conversion zone with respect to the direction of flow of the working medium, a throttling member inserted in the sludge-removing pipe, said tubes being joined up to a common header, a member offering a higher resistance to the flow of working medium from the header to the point at which the sludge-removing pipe is joined up than to the flow in contrary direction being inserted in each tube between the header and the points at which the sludge-removing pipe is joined up.

8. A vapor generator comprising a furnace, said furnace including first and second chambers, combustion means providing a flame for the first chamber and for passage of gaseous products of combustion from the first chamber and through the second chamber, a heating surface formed of tubes, a part of said heating surface being located in the first chamber so as to absorb mainly radiated heat and a part being located in the second chamber so as to absorb heat transmitted mainly by contact, a pump serving to force the working medium to pass through tubes of the radiation heating part in the first chamber and then through tubes of the contact heating part in the second chamber, said working medium flowing continuously under pressure through the heating surface with continuous absorption of heat in order to continuously increase the heat content thereof, the tubes of the heating surface being so dimensioned and arranged, with respect to operation of said combustion means and of said pump, that the zone in which conversion of the medium from the liquid to the vapor state occurs and is accompanied by high concentration of scale-forming impurities is situated in the part of the heating surface located in said second chamber.

9. A vapor generator including a furnace, said furnace comprising a plurality of vertical parallel chambers including first and second chambers, combustion means providing a flame for the first chamber and for passage of gaseous products of combustion from the first chamber and through the second chamber, heating surface formed of tubes and having parts thereof arranged in said chambers and including a first part located in the first chamber so as to absorb mainly radiant heat and a second part located in the second chamber so as to absorb heat transmitted mainly by contact, a pump for forcing working medium to flow in series through the parts of the heating surface and the parts of the heating surface being connected so that medium flows in sequence through said first and second parts, the working medium flowing continuously and under pressure through the parts of the heating surface with continuous absorption of heat so as to increase the heat content thereof, the tubes of said heating surface being so dimensioned and arranged, with respect to operation of said combustion means and of said pump, that the zone in which conversion of the medium from the liquid to the vapor state occurs and is accompanied by high concentration of scale-forming impurities is located in said second part in the second chamber.

10. A vapor generator comprising a furnace, said furnace including first and second parallel chambers; combustion means providing a flame for the first chamber and for passage of gaseous products of combustion from the first chamber and through the second chamber; heating surface formed of tubes and having parts thereof arranged in the chambers and including a first part located in the first chamber so as to absorb mainly radiant heat, a second part in the second chamber so as to absorb mainly contact heat and a third part in one of the chambers and located in the path of heating gas flow between the first and second parts; a pump for forcing working medium to flow in series through the parts of the heating surface and the parts of the heating surface being so connected that the medium flows in sequence through the first, second, and third parts of the heating surface and the medium flowing continuously under pressure with continuous absorption of heat in order to continuously increase the heat content thereof; the tubes of said first, second, and third parts of the heating surface being so arranged and dimensioned, with respect to operating conditions of said combustion means and of said pump, that the zone in which conversion of the medium from the liquid to the vapor state occurs and is accompanied by high concentration of scale-forming impurities is located in the second part of the heating surface arranged in said second chamber.

11. A vapor generator comprising a furnace, a heating surface formed of tubes, a first part of said heating surface being so located in the furnace as to absorb mainly radiated heat and a second part thereof being so located as to absorb heat transmitted mainly by contact, a pump serving to force the working medium to pass through tubes of the first part of said heating surface and then through tubes of the second part thereof in continuous flow and with continuous absorption of heat in order to continuously increase the heat content of said medium, the tubes of said heating surface being so dimensioned and arranged that the zone in which conversion of medium from the liquid to the vapor state occurs and is accompanied by high concentration of scale-forming impurities is located in said second part of the heating surface, said second part of the heating surface including a plurality of tube means arranged for parallel flow of medium therethrough, means providing for removal of impurity concentrations from each of the tube means and capable of selective operation so that concentrations may be removed from said tube means one at a time while maintaining the remainder of said tube means in normal generator operation, and means effective to resist back flow in the tube means when impurity concentrations are being removed therefrom.

12. A vapor generator comprising a furnace, a heating surface formed of tubes, a first part of said heating surface being so located in the furnace as to absorb mainly radiated heat and a second part being so located as to absorb heat transmitted mainly by contact, a pump serving to force the working medium to pass through tubes of the first part of said heating surface and then through tubes of the second part thereof in continuous flow and with continuous absorption of heat in order to continuously increase the heat content of said medium, the tubes of said heating surface being so dimensioned and arranged that the zone in which conversion of medium from the liquid to the vapor state occurs and is accompanied by high concentration of scale-forming impurities is located in said second part of the heating surface, said second part of the heating surface including a plurality of tube means arranged for parallel flow of medium therethrough, impurity concentration removal pipes connected to respective tube means, a valve in each of said pipes for opening and closing the latter, and an orifice plate in each pipe between its valve and the tube means to which it is connected.

13. In a vapor generator, means providing heating space, combustion means for supplying heat to the space, heating surface formed of tubes, a first part of said heating surface being located in a portion of said heating space so as to absorb mainly high intensity radiant heat and a second part of said heating surface being located in a portion of said heating space so as to absorb heat of lower intensity transmitted mainly by contact, a pump for forcing working medium to flow in series through the first and second parts of the heating surface, the working medium flowing continuously and under pressure through the parts of the heating surface with continuous absorption of heat so as to continuously increase the heat content thereof, the tubes of said heating surface being so dimensioned and arranged, with respect to operating conditions of said combustion means and of said pump, that the zone in which conversion of medium from the liquid to the vapor state is accompanied by high concentration of scale-forming impurities is located in said second part of the heating surface, and means providing for periodic removal of impurity concentrations from said second part of the heating surface.

14. In a vapor generator, means providing heating space; combustion means for supplying heat to the space; heating surface formed of tubes; a first part of said heating surface being located in a portion of said heating space so as to absorb mainly high intensity radiant heat, a second part of said heating surface being located in a portion of said heating space so as to absorb heat of lower intensity transmitted mainly by contact, and a third part of said heating surface being located in a portion of said heating space between the first and second parts; a pump for forcing medium to flow in series through said first, second, and third parts of the heating surface; the working medium flowing continuously and under pressure through the parts of the heating surface with continuous absorption of heat so as to increase the heat content thereof; the tubes of said heating surface being so dimensioned and arranged, with respect to operating conditions of said combustion means and of said pump, that the zone in which conversion of the medium from the liquid to the vapor state is accompanied by high concentration of scale-forming impurities is located in said second part of the heating surface; and means providing for periodic removal of impurity concentrations from said second part of the heating surface.

WILHELM ABENDROTH.